(12) United States Patent
Reimers et al.

(10) Patent No.: US 8,051,335 B1
(45) Date of Patent: Nov. 1, 2011

(54) RECOVERY FROM TRANSITORY STORAGE AREA NETWORK COMPONENT FAILURES

(75) Inventors: Jan Reimers, Brookline, NH (US); Chris Busick, Shrewsbury, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 324 days.

(21) Appl. No.: 12/131,713

(22) Filed: Jun. 2, 2008

(51) Int. Cl.
*G06F 11/00* (2006.01)
(52) U.S. Cl. .............................. 714/43; 714/48
(58) Field of Classification Search .......... 714/43, 714/4, 47, 48, 26
See application file for complete search history.

(56) References Cited

U.S. PATENT DOCUMENTS

| | | | | |
|---|---|---|---|---|
| 6,341,356 B1 * | 1/2002 | Johnson et al. | ................... | 714/4 |
| 6,952,734 B1 * | 10/2005 | Gunlock et al. | ............... | 709/227 |
| 6,988,224 B2 * | 1/2006 | Robison et al. | ................... | 714/47 |
| 7,093,155 B2 * | 8/2006 | Aoki | ................... | 714/4 |
| 7,275,103 B1 * | 9/2007 | Thrasher et al. | ............... | 709/224 |
| 2003/0023893 A1 * | 1/2003 | Lee et al. | ........................... | 714/4 |
| 2005/0246590 A1 * | 11/2005 | Lancaster | ....................... | 714/47 |
| 2008/0162981 A1 * | 7/2008 | Jajoo et al. | ........................ | 714/2 |
| 2010/0050022 A1 * | 2/2010 | Komatsu et al. | ................ | 714/43 |

* cited by examiner

*Primary Examiner* — Yolanda L Wilson
(74) *Attorney, Agent, or Firm* — Leon S. Erikson; John R. Ley

(57) ABSTRACT

Lun communications between a storage server and a storage subsystem for a particular lun are assigned both a current path and an alternate path. Lun communications use the current path unless the current path is determined to be faulty. Path errors may result in the storage server determining a path to be faulty. If the current path for a lun communication is determined to be faulty, then the lun communications will be sent through the alternate path so long as the alternate path is determined to be reliable. Over time, a path previously determined to be faulty may recover and be used again for lun communications.

24 Claims, 5 Drawing Sheets

RECOVERY FROM TRANSITORY STORAGE AREA NETWORK COMPONENT FAILURES

This invention relates to communication in a storage area network. More particularly, the present invention involves a new and improved apparatus and technique for recovering from communication errors in a storage area network by determining communications paths to be faulty and eliminating communication traffic or load on the faulty paths. The faulty path may recover over time, at which point the communication load may be restored over the previously faulty path, thus improving the performance and reliability of the storage area network by avoiding communication load while the path is faulty and restoring the communication load when the path recovers.

BACKGROUND OF THE INVENTION

Many businesses use computers to process vast amounts of business related data. Data accessed by computers is typically stored either on locally attached disk drives or on a storage server. A storage server is a computer that is connected to a storage subsystem or data storage medium and offers data storage services to client computers. Using a storage server for data storage services has several advantages over using locally attached disk drives, including cost savings resulting from centralized data storage management and more efficient storage space utilization.

Storage servers store data from client computers on a storage subsystem to which the storage servers are connected. The storage space on the storage subsystem which is available for the storage server to use may be presented to the storage server as one or more virtual disks. Each virtual disk has a different Logical Unit Number (lun) identifier and the virtual disks are collectively referred to as luns. Lun communication between the storage server and the storage subsystem occurs over communication cables which connect the storage server to the storage subsystem. Lun communication is primarily individual input output (I/O) commands associated with a particular lun. A communications route between the storage server and the storage subsystem over a particular communications cable is referred to as a path. Typically, a lun is assigned two paths as redundant communication routes. I/O commands associated with a lun are sent through one of the paths assigned to the lun from the storage server to the storage subsystem and responses to the I/O command from the storage subsystem are typically sent to the storage server through the same path the I/O command was received on.

Many businesses rely on storage servers to such a degree that any unplanned outage of service from the storage server, however brief, can have a significant adverse impact on the business. Storage servers, like other computers, are made of different computer components that perform specialized functions. Computer components and related electronic devices sometimes fail and cease to operate. Computer components that are necessary for the continued operation of a storage server can cause the storage server to become inoperative when those computer components fail. Redundancy is usually built into the storage server to reduce the reliance of a storage server on a particular component. In a computer context, redundancy generally refers to a computer having multiple components of a particular type and being programmed to use an alternate component when a particular component fails, so that the computer can continue to operate.

A storage server with redundant paths can still offer storage services to client computers when one of those paths fails due to a component failure. Typically, an operating system of the storage server is programmed to detect a path failure and to redirect lun communications from the failed path to a redundant or alternate path. The operating system or other similar related program of the storage server typically notifies an administrator of the path failure so that the faulty component can be identified and replaced.

Occasionally, a computer component may experience intermittent failures. Intermittent failures may be caused by loose connections, signal interference, or other spurious causes. Oftentimes an intermittent failure of a computer component is a precursor of an impending total failure of the computer component. Replacing a computer component that is experiencing intermittent failures before it totally fails is usually a sound policy. Intermittent failures of a computer component can also be a one-time occurrence instead of a sign of impending total failure. In the case when an intermittent failure of a computer component is an isolated event, assuming the computer component to be faulty and then replacing the component is a costly and unnecessary response. Continuing to use a computer component that is experiencing intermittent failures is also less than optimal due to an increased risk of data corruption and decreased performance and efficiency.

SUMMARY OF THE INVENTION

This invention eliminates the lun communication load from a faulty path between a storage server and a storage subsystem by redirecting the lun communication to an alternate path. Over time, the faulty path may eventually recover, at which point the lun communication load may be restored onto the previously faulty path. Errors related to a particular path are categorized by error type. The error types are assigned weight which establish relative severities among the different error types. Error counts are maintained for each error type that occurs for each path between the storage server and the storage subsystem. After each path related error occurs, a weighted error value is calculated for the path based on the error counts and the weights associated with the error types corresponding to the error counts. If the weighted error value for the path exceeds a predetermined threshold, then the path is considered to be faulty and the path will not be used for future I/O commands so long as a reliable alternate path is available.

The error counts for each path are decremented on a periodic basis. If new errors occur on a path with a frequency greater than the rate at which the error counts are decremented, then the error counts for the path will increase over time. If new errors occur on a path with a frequency less than the rate at which the error counts are decremented, then the error counts for the path will decrease over time. This results in relatively higher error counts when many errors occur within a time period and relatively lower error counts when fewer errors occur within the time period. The error counts and the assigned weights can then be used as a basis for determining whether or not a path is faulty and whether or not a path is reliable at a specific point in time.

Over time, a previously faulty path may have recovered and be reliable. A path is determined to be reliable if the weighted error value for the path is less than a percentage of the predetermined threshold. A reliable path may be thereafter used to send I/O commands from the storage server to the storage subsystem.

In this manner, I/O commands are assured a reliable path between the storage server and the storage subsystem, the faulty path is allowed time to recover from an intermittent failure, and the costs of misdiagnosing the computer components of the path as faulty and replacing them is avoided.

One aspect of the invention involves a mass data storage system including a storage server and storage subsystem. Data is stored in the storage subsystem on luns. A plurality of communications paths connect the storage server and the storage subsystem. Different types of errors related to a particular path are detected and categorized. The storage server stores error counts for the different types of errors occurring for each of the communications paths. These error counts are decremented on a periodic basis. The storage server computes weighted error values for the paths from the error counts and the weight values. The storage server removes from service a path when its weighted error value is greater than a predetermined threshold.

Another aspect of the invention relates to a method of removing a communications path from service. Errors are detected on the communications path. The errors are categorized by error type. Weight values are associated with each of the error types. The number of errors of each error type are counted. The error counts are decremented periodically. A weighted error value is computed for the path from the error counts and the weight values. The path is removed from service when the weighted error value is greater than a predetermined threshold.

Other aspects of the invention, and a more complete appreciation of the present invention, as well as the manner in which the present invention achieves the above and other improvements, can be obtained by reference to the following detailed description of a presently preferred embodiment taken in connection with the accompanying drawings, which are briefly summarized below, and by reference to the appended claims.

DETAILED DESCRIPTION

Lun communications are redirected to a reliable alternate path when a currently used path is determined to be faulty. A path is determined to be reliable or faulty based on the relative frequency of errors occurring on the path. A path that was previously determined to be faulty may be determined to be reliable if the frequency of errors for the path is reduced over time.

Figure 1:
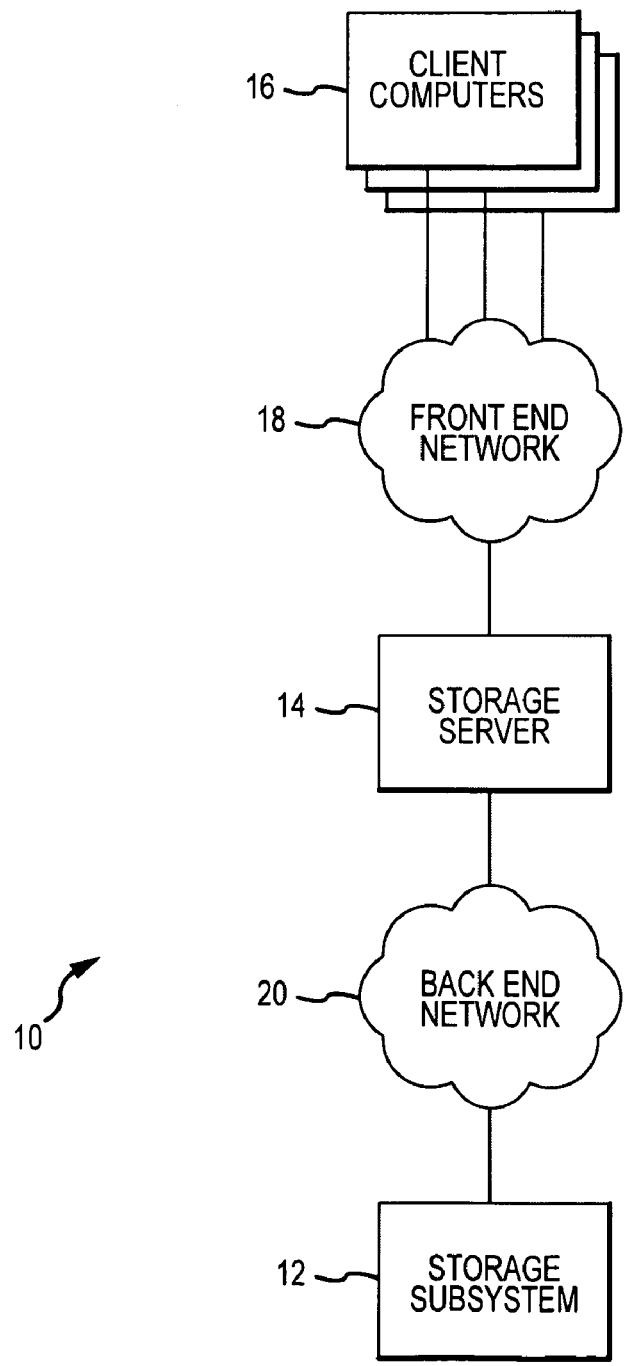
FIG. 1 is a block diagram of an exemplary mass data storage computer network which incorporates the present invention. The network includes a storage server, a storage subsystem and clients.

An exemplary storage network 10 which implements the present invention is shown in FIG. 1. The storage network 10 includes a storage subsystem 12 on which data is stored by a storage server computer ("storage server") 14. The storage server 14 supplies storage services to multiple client computers 16. The storage server 14 is connected to the client computers 16 by a front end network 18. The front end network 18 may be a general communications network such as a Transmission Control Protocol/Internet Protocol (TCP/IP) network or other network suitable for data storage communications, such as a Storage Area Network (SAN). The storage server 14 is connected to the storage subsystem 12 by a back end network 20. The back end network 20 is a network suitable for high bandwidth storage communications between the storage server 14 and the storage subsystem 12, such as a SAN.

Figure 2:
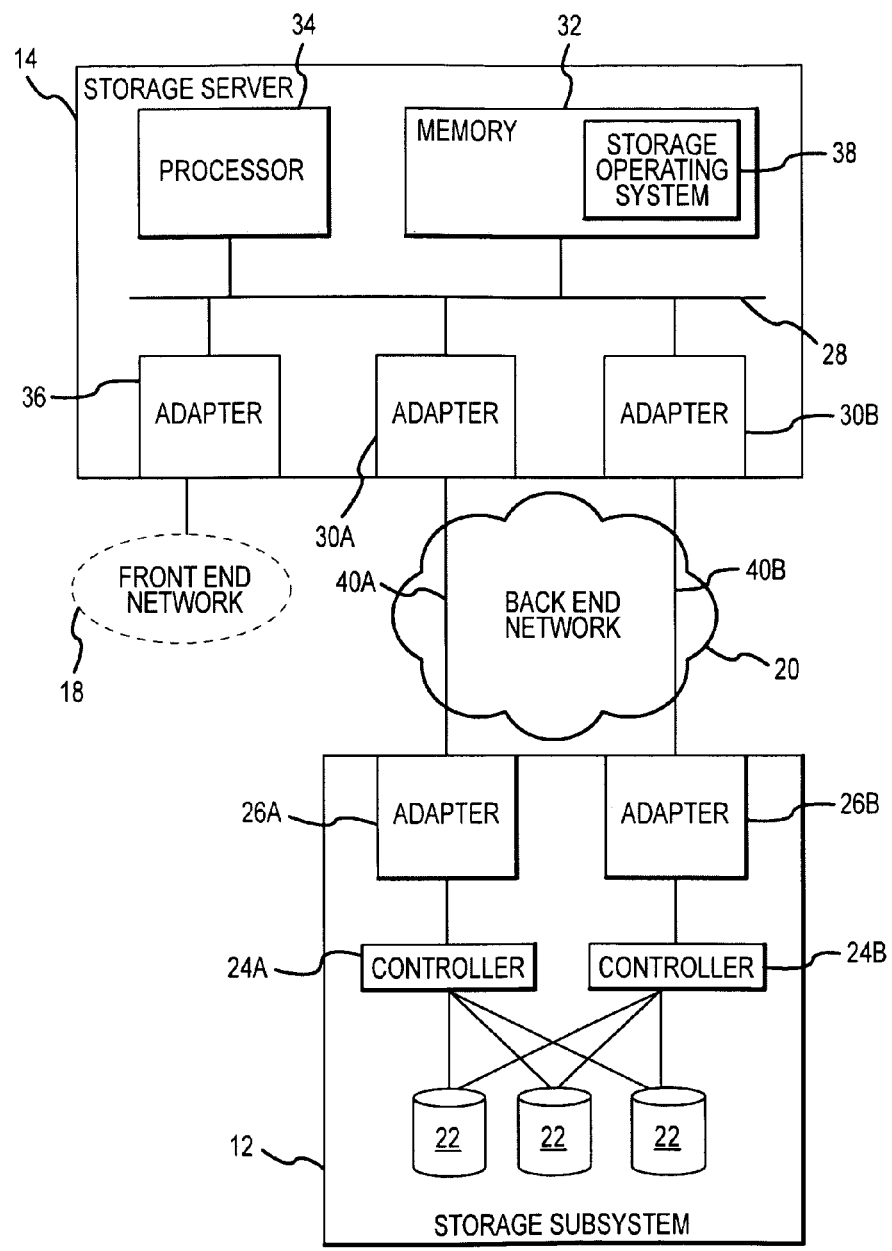
FIG. 2 is a diagrammatic illustration of the storage server and storage subsystem of the computer network shown in FIG. 1.

A more detailed view of the back end network 20 and the connections between components of the storage server 14 and the storage subsystem 12 is shown in FIG. 2. The storage subsystem 12 includes multiple storage units 22 which store data, two controllers 24A and 24B, both of which write data to and read data from the storage units 22, and adapters 26A and 26B, such as fibre channel adapters, which communicate with the controllers 24A and 24B. The storage units 22 may be conventional disk drives, solid state disk drives, or other devices suitable for storing data.

The storage server 14 includes a system bus 28 to which are attached adapters 30A and 30B, a memory 32, a processor 34, and an adapter 36. The various components connected to the system bus 28 communicate with each other over the system bus 28. The memory 32 contains a storage operating system 38 which is executed by the processor 34 to enable the overall functionality of the storage server 14. The adapter 36 is connected to the front end network 18. Communication between the storage server and the client computers 16 (FIG. 1) is through the adapter 36. The adapters 30A and 30B are connected to and communicate with the adapters 26A and 26B over cables 40A and 40B, respectively.

Although the adapters 30A and 30B are illustrated as being directly connected to the adapters 26A and 26B by the cables 40A and 40B, other devices such as SAN switches, hubs and the like may be incorporated in the back end network 20 between the storage server 14 and the storage subsystem 12 in different embodiments of the present invention.

Communications between the storage server 14 and the storage subsystem 12 occur through either of the two cables 40A or 40B. Each of the two cables 40A and 40B, along with the adapters 30A and 26A or 30B and 26B, constitute redundant communications paths ("paths") for lun communication between the storage server 14 and the storage subsystem 12.

Figure 3:
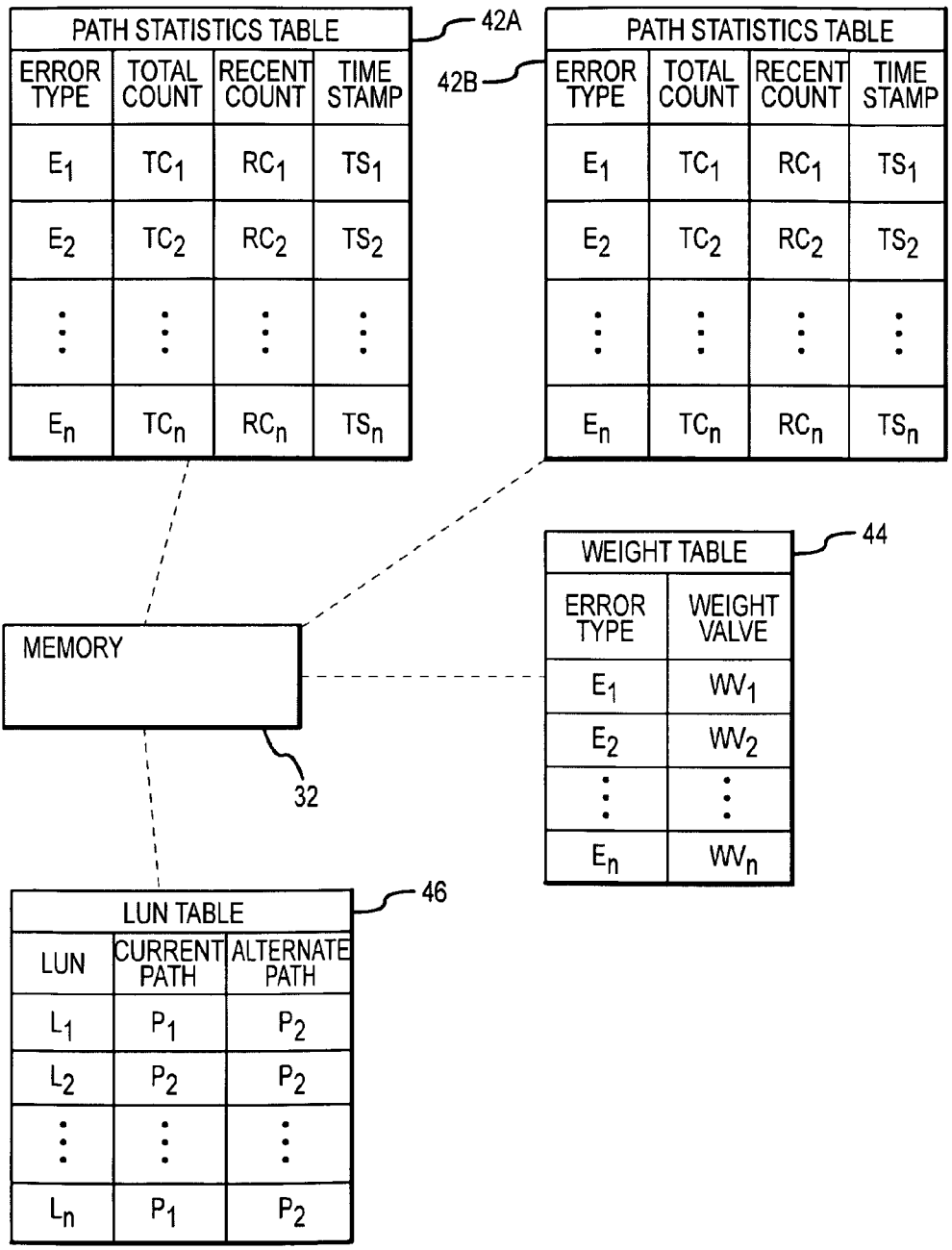
FIG. 3 is a diagrammatic illustration of data structures present in a memory of the storage server shown in FIG. 2.

Path statistics tables 42A and 42B shown in FIG. 3 reside in the memory 32 of the storage server 14 (FIG. 2). The path statistics tables 42A and 42B each record errors related to one of the paths between the storage server 14 and the storage subsystem 12. There are a finite number of different types of path related errors that are detected by the storage operating system 38 (FIG. 2), and these different error types are represented by the letters E1-En in the path statistics tables 42A and 42B. Examples of the types of errors E1-En may represent include SCSI phase errors, I/O timeout errors, bus transport errors, and device timeout errors, among others. Embodiments of the invention that use different communication protocols or different communications adapters between the storage server 14 and the storage subsystem 12 will have different sets of well known and occasionally occurring types of errors.

There are three types of information stored in the path statistics table 42A and 42B for each error type. A total count of the number of errors for each error type is represented by TC1-TCn. For example, the total count for error E1 is TC1. Total counts TC1-TCn represent the respective total number of occurrences of error types E1-En that have occurred for a particular path. The total counts TC1-TCn are useful for evaluating components related to the total counts TC1-TCn to determine if replacing the component is warranted, among other things. The recent counts RC1-RCn of the path statistics tables 42A and 42B represent a count of the number of errors for each respective error type E1-En that have occurred recently. The recent counts RC1-RCn are similar to the total counts TC1-TCn in that they are both incremented when an error of type E1-En occurs, respectively, but unlike the total counts TC1-TCn, the values represented by RC1-RCn are each decremented over predefined time intervals. Decrementing the values represented by RC1-RCn over time results in relatively lower values when error conditions are less frequent and relatively higher values when error conditions are more frequent. The values represented by RC1-RCn are preferably decremented by one for each time interval, but could also be decremented by some other logic, for example based on the relative frequency or the innocuousness of the particular error type E1-En respectively associated with recent counts RC1-RCn. Also stored in the path statistics tables 42A-42B is a timestamp TS1-TSn for each error type E1-En that represents the time when the last occurrence of the error type E1-En occurred. The total counts TC1-TCn and the timestamps TS1-TSn aid a system administrator in diagnosing errors on the storage server 14.

A weight table 44 contains an entry for each error type E1-En and a corresponding weight value WV1-WVn for each error type E1-En, respectively. The weight values WV1-WVn represent the relative severity of the errors E1-En. The weight values WV1-WVn within the weight table 44 are preferably easily modified by an administrator of the storage server 14 so that the weight values WV1-WVn can be adapted as needed for a particular storage server installation. The weight table 44 is preferably initially populated with preferred weight values WV1-WVn from a manufacturer of the storage server 14.

A lun table 46 associates luns with both a current path and an alternate path. Luns are represented by L1-Ln in the lun table 46. Communications for each lun L1-Ln are assigned both a current path and an alternate path, represented by the references P1 and P2. Lun communications for a particular lun L1-Ln are generally sent over the current path with the alternate path available as a backup path in case the current path becomes faulty. The references P1 and P2 correspond to communications paths over the cables 40A and 40B respectively.

The path statistics tables 42A and 42B, the weight table 44 and the lun table 46 present information for use by the storage operating system 38 in evaluating paths to determine both if a path is faulty and if a path is reliable. The recent error counts RC1-RCn in the path statistics tables 42A and 42B are incremented and decremented according to the process flows 48 and 60 shown in FIGS. 4 and 5.

Figure 4:
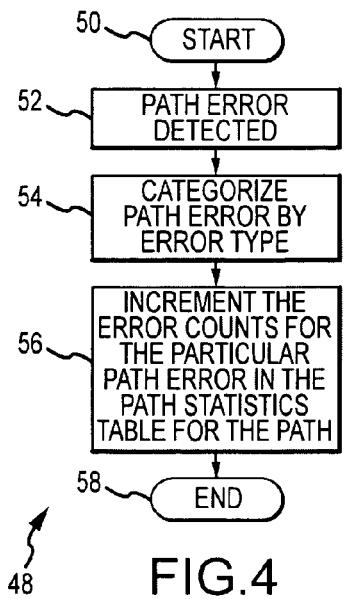
FIG. 4 is a flow chart of exemplary actions taken by the storage server shown in FIG. 2 when an error occurs on a communications path between the storage server and the storage subsystem.

A logic flow 48 for incrementing both the total error counts TC1-TCn and the recent error counts RC1-RCn in a particular path statistics table 42A or 42B (FIG. 3) is shown in FIG. 4. The logic flow 48 starts at 50 and is executed by a process of the storage operating system 38 (FIG. 2) every time a path error occurs. A path error related to one of the communications paths occurs at 52. At 54, the path error is categorized as being one of the error types E1-En. The particular recent count, one of RC1-RCn, and the particular total count, one of TC1-TCn in the path statistics table 42A or 42B corresponding to the path with the path error, are then each incremented by one at 56. The logic flow 48 ends at 58.

Figure 5:
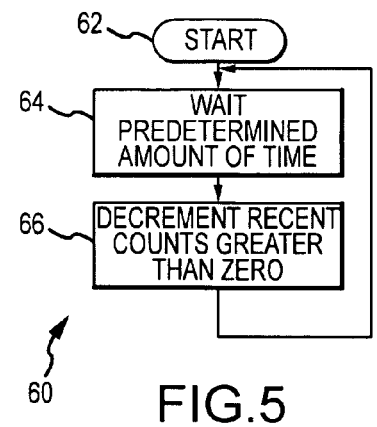
FIG. 5 is a flow chart of exemplary actions taken by the storage server shown in FIG. 2 to reduce error counts on a periodic basis.

A logic flow 60 for decrementing the recent error counts RC1-RCn in all the path statistics tables 42A and 42B is shown in FIG. 5. The logic flow 60 is executed by a process of the storage operating system 38 (FIG. 2) and starts at 62, preferably as soon as the storage operating system 38 starts providing storage services. At 64, the storage operating system 38 waits a predetermined amount of time, such as two minutes. Then, at 66, the recent counts RC1-RCn greater than zero in the path statistics tables 42A and 42B are decremented by a constant number, such as by one. Other embodiments of the invention may decrement the recent counts RC1-RCn by another number, or different numbers based on an algorithm. The logic flow 60 loops back to 64 after 66 and repeats.

The combination of the two logic flows 48 and 60 results in relatively higher recent counts RC1-RCn when path errors for a path are frequent and relatively lower recent counts RC1-RCn when path errors for the path are less frequent. The recent counts RC1-RCn thus supply a basis for determining when the path is determined faulty and when a path is determined reliable. The following two logic flows 68 and 82 shown in FIGS. 6 and 7 make use of the recent counts as well as the weight values WV1-WVn in determining whether or not a path is faulty or whether or not a path is reliable.

Figure 6:
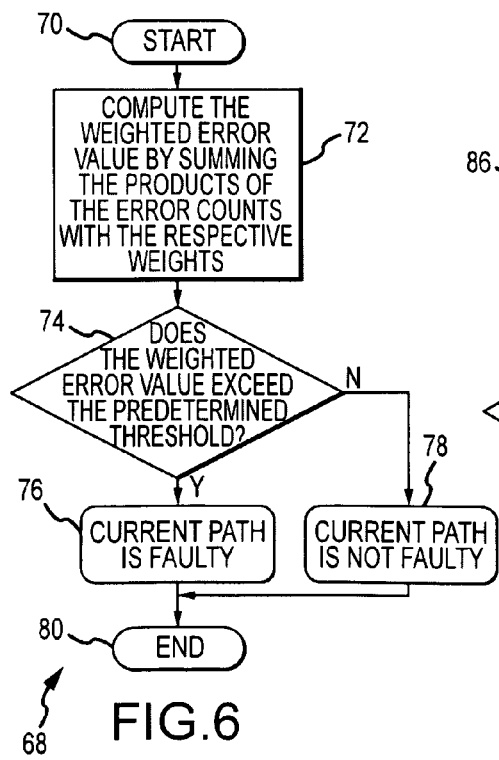
FIG. 6 is a flow chart of exemplary actions taken by the storage server shown in FIG. 2 in order to determine whether a communications path is faulty.

The exemplary logic flow 68 shown in FIG. 6 determines whether or not the current path used by a lun is faulty. The logic flow 68 is executed by a process of the storage operating system 38 (FIG. 2) and starts at 70. A weighted error value is computed, at 72, for the current path using the recent counts RC1-RCn of the path statistics table 42A or 42B associated with the path and the weights WV1-WVn from the weight table 44 (FIG. 3). The weighted error value is computed by multiplying each of the recent counts RC1-RCn of the current path by the corresponding weights WV-WVn for all of the error types E1-En and then summing those products. At 74, a determination of whether the weighted error value exceeds a predetermined threshold is made. The predetermined threshold is a number chosen so that a weighted error value greater than the predetermined threshold indicates that the current path is faulty and a weighted error value less than the predetermined threshold indicates that the current path is still serviceable. If the determination at 74 is affirmative, then at 76 the current path is determined to be faulty. If the determination at 74 is negative, then at 78 the current path is determined not to be faulty. The process flow ends at 80.

Figure 7:
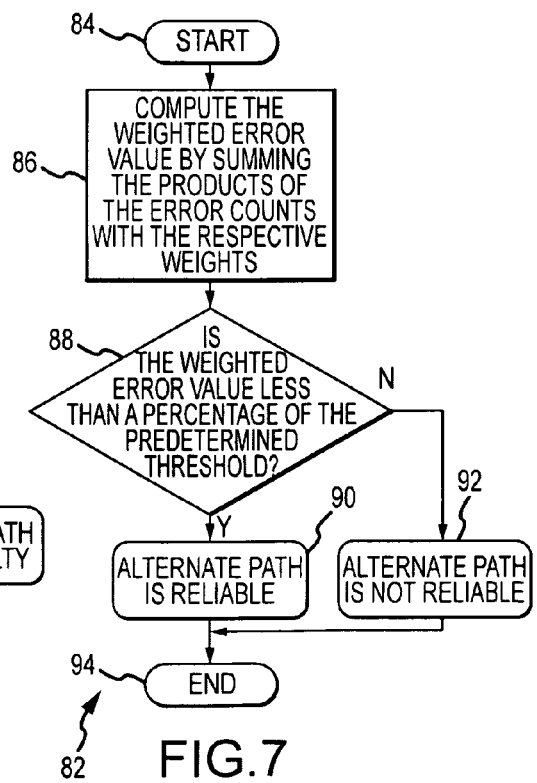
FIG. 7 is a flow chart of exemplary actions taken by the storage server shown in FIG. 2 to determine if a communications path is reliable.

The exemplary logic flow 82 shown in FIG. 7 determines whether or not an alternate path of a lun is reliable. The logic flow 82 is executed by a process of the storage operating system 38 (FIG. 2) and starts at 84. At 86, a weighted error value is then computed for the path in the same manner as previously discussed for the process flow 68 at 72. The weighted error value is computed by multiplying each of the recent counts RC1-RCn of the alternate path by the corresponding weights WV-WVn for all of the error types E1-En and then summing those products. A determination is then made, at 88, as to whether the weighted error value is less than a percentage of the predetermined threshold. If the determination at 88 is affirmative then at 90 the alternate path is determined to be reliable. If the determination at 88 is negative then at 92 the alternate path is determined to be unreliable. The comparison at 88 is made between the weighted error value and a percentage of the predetermined threshold instead of with the predetermined threshold itself, to gain a higher confidence that the alternate path is reliable, and not just serviceable. A preferred percentage to use in the determination at 88 is a value of twenty percent. The process flow 82 ends at 94.

The process flow 68 for determining if a current path is faulty and the process flow 82 for determining if an alternate path is reliable are both used in two additional process flows shown in FIGS. 8 and 9 and described below.

Figure 8:
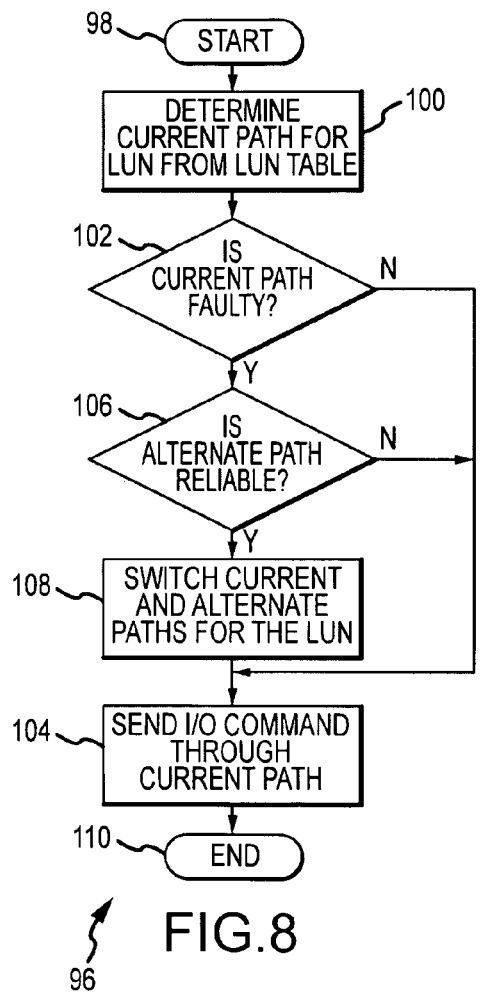
FIG. 8 is a flow chart of exemplary actions taken by the storage server shown in FIG. 2 to determine which of two communications paths to use.

A logic flow 96 for determining which of the current or alternate paths a particular lun should use to send I/O commands through is shown in FIG. 8. The logic flow 96 is executed by a process of the storage operating system 38 (FIG. 2) before an I/O command is sent from the storage server 14 (FIG. 2) to the storage subsystem 12 (FIG. 2) for a particular lun L1-Ln. The logic flow 96 starts at 98. At 100, the current path and the alternate path for the lun are determined from the lun table 46 (FIG. 3) by finding which path P1 or P2 in the current path column is associated with the particular lun L1-Ln. At 102, a determination is made as to whether the current path is faulty by executing the logic flow 68 (FIG. 6). If the determination at 102 is negative, then the current path is still serviceable and the I/O commands are sent through the current path at 104. If the determination at 102 is affirmative, indicating that the current path is faulty, then at 106 a determination is made of whether the alternate path for the lun is reliable by executing the logic flow 82 (FIG. 7). If the determination at 106 is negative, then the logic flow 96 progresses to 104 and the I/O command is sent through the current path 84. In this circumstance, the current path has been determined to be faulty and the alternate path has been determined to be unreliable. The current path is used for the I/O command rather than the alternate path even though the current path may have a weighted error value greater than the weighted error value of the alternate path, indicating that the current path is more error prone than the alternate path. This prevents the lun communications from constantly switching between the current and alternate paths when the weighted error values associated with the paths are close in value. The storage network 10 incurs a performance penalty when the path a lun is using switches from the current path to the alternate path. This is due to caches within the adapters 30A, 30B, 26A, 26B and the controllers 24A and 24B needing to be cleared of data related to the lun being switched, which takes a certain amount of time to accomplish. Repeated switching of the path a lun is using therefore adds delay to the completion of I/O commands associated with the lun and increases the likelihood that those I/O commands will fail due to timeouts when the paths are experiencing errors. If the determination at 106 is affirmative, then at 108 the current and alternate status of the two communications paths for the lun are interchanged in the lun table 46. The logic flow 96 progresses to 104 after 108 and the I/O command is sent through the current path. The logic flow ends at 110.

The process flow 96 switches the current communications path of a lun to the alternate communications path of that same lun in the lun table 46 when the current path is determined to be faulty and the alternate path is determined to be reliable. Switching the current and alternate paths of luns whose current path is faulty removes the communications load from the faulty path and allows I/O commands to be sent more efficiently between the storage server 14 and the storage subsystem 12 over a reliable path. In the case where the current path for the lun is faulty and the alternate path is not reliable, there is no assurance that switching the current and alternate paths will improve performance, so lun communications are allowed to continue over the current faulty path.

Figure 9:
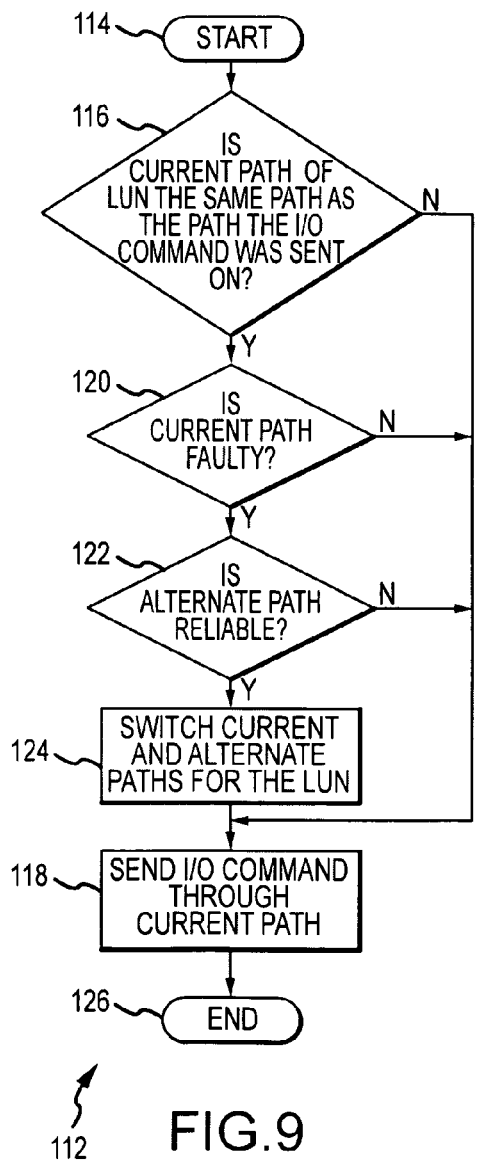
FIG. 9 is a flow chart of exemplary actions taken by the storage server shown in FIG. 2 to determine if I/O commands sent through a communications path should be aborted and resent through an alternate communications path.

A logic flow 112 which determines whether to resend an I/O command through the current path or the alternate path of the lun associated with the I/O command is shown in FIG. 9. The logic flow 112 is executed by a process of the storage operating system 38 (FIG. 2) whenever an I/O command does not complete successfully and needs to be retried.

Although the logic flow 112 contains some similar determinations to the logic flow 96 (FIG. 8), the logic flows 112 and 96 are different and are executed for different purposes. The logic flow 96 is executed to determine which of the current or alternate paths of a lun should be used for new lun communication in the form of an I/O command. The logic flow 112 is executed in order to determine what to do with an I/O command that did not complete successfully and which needs to be retried.

The logic flow 112 starts at 114. At 116, a determination is made as to whether the current path of the lun associated with the I/O command is the same path as the path through which the I/O command was previously sent. Since individual pending I/O commands are allowed to continue processing when the paths for the lun associated with those I/O commands are switched, there will occasionally be pending I/O commands using the alternate path of the lun those I/O commands are associated with. If the path that the I/O command was previously sent through is now the alternate path for the lun associated with the I/O command, then resending the I/O command through the current path of the lun results in the I/O command being sent through a different path than the path the I/O command previously used. If the determination at 116 is negative, then the logic flow 112 continues to 118, where the I/O command is sent through the current path. If the determination at 116 is affirmative, then the logic flow 112 progresses to 120. A determination is then made, at 120, whether the current path is faulty according to the logic flow 68 (FIG. 6). If the determination at 120 is negative, then the path has been determined not to be faulty and the logic flow 112 continues to 118. If the determination at 120 is affirmative, then at 122 whether the alternate path is reliable is determined according to the process flow 82 (FIG. 7). If the determination at 122 is negative then the alternate path has been determined to be unreliable and the process flow 112 continues to 118. If the determination at 122 is affirmative, then at 124 the current and alternate paths for the lun are switched in the lun table 46 (FIG. 3). At 118, the I/O command is sent through the current path. The process flow 112 ends at 126. Switching the current and alternate paths of a lun when the current path is faulty and the alternate path is reliable ensures that the I/O commands will have a reliable non-faulty path to reach the storage subsystem 12 (FIG. 1) from the storage server 14 (FIG. 1). Other I/O commands associated with the lun which may still be pending when the paths for the lun are switched continue processing on the alternate path. These other I/O commands still using the alternate path of the lun eventually finish successfully, get resent through the current path, or timeout.

All of the luns which have a current path which is determined to be faulty will eventually switch alternate and current paths for the lun in the lun table 46 (FIG. 3), if the alternate path is reliable, as per the logic flows 96 (FIG. 8) and 112 (FIG. 9), thereby effectively removing the faulty path from service.

The above described processes help ensure the reliability of lun communications over multiple paths between a storage server and a storage subsystem. Switching the current and alternate paths for a lun when the current path is faulty and the alternate path is reliable ensures that lun communications are sent between the storage server and the storage subsystem over a reliable path while avoiding the performance penalty associated with repeatedly switching between the paths assigned to the lun. Allowing time to pass over which the recent counts in the path statistics tables 42A and 42B are reduced as per the logic flow 112 (FIG. 8) affords a faulty path time to recover in the event that the errors triggering the faulty determination were an isolated occurrence. Allowing a faulty path time to recover avoids the expense of assuming components within the paths have failed and replacing those components.

The use of the term "storage operating system" is used herein to describe the software that performs the described processes, and is not meant to limit the execution of those processes solely to a specific type of software.

A presently preferred embodiment of the present invention and many of its improvements have been described with a degree of particularity. This description is a preferred example of implementing the invention, and is not necessarily intended to limit the scope of the invention. The scope of the invention is defined by the following claims.

What is claimed:

1. A mass data storage system comprising a storage server computer, a data storage subsystem, and a plurality of communication paths connecting the storage server computer to the data storage subsystem over which communications are conducted between the storage server computer and the data storage subsystem, each communication path subject to multiple different types of errors each having a specific severity which negatively affects the communications over that communication path; and wherein the storage server computer is operative to:

detect each type of error which occurs on each communication path;

count each detected error for each communication path on a continuous ongoing basis to establish an accumulated count value equal to the number of each type of detected error for each communication path;

decrement the accumulated count value for each type of detected error for each communication path by a predetermined amount at periodic intervals to establish a decremented accumulated count value until the decremented accumulated count value for each type of error for each communication path reaches a zero value;

attribute a weight value for each type of detected error related to the severity of the type of detected error;

calculate a weighted error value for each communication path by multiplying the weight value for each type of error by the decremented accumulated count value for each type of error and adding the results of such multiplications for each communication path;

establish a first fault threshold of weighted error values indicative of unreliable communications over each communication path;

establish a second fault threshold of weighted error values indicative of reliable communications over each communication path, the second fault threshold being less than the first fault threshold;

cease use of any one communication path for communications when the weighted error value for that one communication path exceeds or is equal to the first fault threshold; and resume use of the one communication path when the weighted error value for that one communication path is less than or equal to the second fault threshold.

2. A mass data storage system as defined in claim 1, wherein:

the data storage subsystem has a plurality of luns for storing data;

a communication between the storage server computer and the data storage subsystem pertaining to each lun constitutes a lun communication;

a first communication path and a second communication path are associated with each lun;

the storage server computer initially uses the first communication path for lun communications to each lun; and the storage server computer stops using the first communication path for lun communications to each lun and starts using the second communication path for lun communications to that lun when the weighted error value for the first communication path exceeds or is equal to the first fault threshold and the weighted error value for the second communication path is less than or equal to the second fault threshold.

3. A mass data storage system as defined in claim 2, wherein:

each lun communication comprises an input/output ("I/O") command sent from the storage server computer to the data storage subsystem and a response to the I/O command sent from the data storage subsystem to the storage server computer; and the storage server computer resends each I/O command through the second communication path for any lun when the storage server computer has not yet received a response to any I/O command previously sent through the first communication path associated with that lun after the storage server computer starts using the second communication path.

4. A mass data storage system as defined in claim 1, wherein:

the type of at least one of the errors detected on one communication path is different from the type of errors detected on a different communication path.

5. A mass data storage system as defined in claim 1, wherein:

at least two different weight values are established for at least two different types of detected errors on each communication path.

6. A mass data storage system as defined in claim 1, wherein:

the accumulated count values are decremented for each type of error for each communication path at the same periodic intervals.

7. A mass data storage system as defined in claim 1, wherein:

the amount by which the accumulated count value for one type of detected error is decremented is different from the amount by which the accumulated count value for a different type of error is decremented for at least one communication path.

8. A mass data storage system as defined in claim 1, wherein:

the weight value attributed to each type of detected error is predetermined.

9. A mass data storage system as defined in claim 1, wherein:

the second fault threshold is a predetermined percentage of the first fault threshold.

10. A method of determining the use of a plurality of communication paths connecting a storage server computer to a data storage subsystem for communications between the storage server computer and the data storage subsystem, each communication path subject to multiple different types of errors each having a specific severity which negatively affects the communications over that communication path, comprising:

- detecting each type of error which occurs on each communication path;
- attributing a weight value for each type of detected error related to the severity of the type of detected error;
- counting each detected error for each communication path on a continuous ongoing basis to establish an accumulated count value equal to the number of each type of detected error for each communication path;
- decrementing the accumulated count value for each type of detected error for each communication path by a predetermined amount at periodic intervals to establish a decremented accumulated count value until the decremented accumulated count value for each type of error for each communication path reaches a zero decremented accumulated count value;
- calculating a weighted error value for each communication path by multiplying the weight value for each type of error by the decremented accumulated count value for each type of error and adding the results of such multiplications for each communication path;
- establishing a first fault threshold of weighted error values indicative of unreliable communications over each communication path;
- establishing a second fault threshold of weighted error values indicative of reliable communications over each communication path, the second fault threshold being less than the first fault threshold;
- ceasing use of any one communication path for communications when the weighted error value for that one communication path equals or exceeds the first fault threshold; and
- resuming use of the one communication path when the weighted error value for that one communication path is less than or equal to the second fault threshold.

11. A method as defined in claim 10, wherein the data storage subsystem has a plurality of virtual disks ("luns") for the storage and retrieval of data by the storage server computer, communications between the storage server computer and the data storage subsystem related to one of the luns constituting lun communications, the method further comprising:

- associating a first and a second communication path with each lun,
- initially using the first communication path for lun communications to each lun; and
- stopping use of the first communication path for lun communications to any lun and starting use of the second communication path for lun communications to that lun when the weighted error value of the first communication path is greater than or equal to the first fault threshold and the weighted error value of the second communication path is less than or equal to the second fault threshold.

12. A method as defined in claim 11, wherein each lun communication comprises an I/O command sent from the storage server computer to the data storage subsystem and a response to the I/O command from the data storage subsystem to the storage server computer, the method further comprising:

- resending each I/O command through the second communication path for any lun when the storage server computer has not received a response to any I/O command previously sent through the first communication path associated with that lun after the storage server computer starts using the second communication path.

13. A method as defined in claim 10, further comprising: detecting at least one error on one communication path which is different from the type of errors detected on a different communication path.

14. A method as defined in claim 10, further comprising: attributing different weight values for at least two different types of detected errors on each communication path.

15. A method as defined in claim 10, further comprising: decrementing the accumulated count value for each type of error for each communication path at the same periodic interval.

16. A method as defined in claim 10, further comprising: decrementing the accumulated count values for at least two different types of errors for each communication path by different predetermined amounts.

17. A method as defined in claim 10, further comprising: attributing predetermined weight values for each type of detected error.

18. A method as defined in claim 10, further comprising: establishing the second fault threshold as a predetermined percentage of the first fault threshold.

19. A mass data storage system comprising a storage server computer, a data storage subsystem, and a plurality of communication paths connecting the storage server computer and the data storage subsystem over which communications are conducted between the storage server computer and the data storage subsystem, each communication path subject to multiple different types of errors each having a specific severity which negatively affects the communications over that communication path, and wherein the storage server computer is operative to:

- calculate a weighted error value for each communication path by multiplying a weight value for each type of error that occurs on each communication path by a count value for each error type and adding the results of all such multiplications for each communication path;
- establish first and second fault thresholds of weighted error values indicative of unreliable and reliable communications over each communication path, respectively, the second fault threshold being less than the first fault threshold;
- cease use of any one communication path for communications when the weighted error value for the one communication path exceeds or is equal to the first fault threshold; and
- resume use of the one communication path when the weighted error value for the one communication path is less than or equal to the second fault threshold.

20. A mass data storage system as defined in claim 19, wherein each count value relates to the number of occurrences of each type of error per communication path.

21. A mass data storage system as defined in claim 19, wherein the storage server computer is further operative to:

- decrement the count values for each error type and for each communication path which are greater than zero at a periodic interval.

22. A method of determining the use of a plurality of communication paths connecting a storage server computer to a data storage subsystem for communications between the storage server computer and the data storage subsystem, each communication path subject to multiple different types of errors each having a specific severity which negatively affects the communications over that communication path, comprising:

calculating a weighted error value for each communication path by multiplying a weight value for each type of error that occurs on each communication path by a count value for each error type and adding the results of all such multiplications for each communication path;

establishing first and second fault thresholds of weighted error values indicative of unreliable and reliable communications over each communication path, respectively, the second fault threshold being less than the first fault threshold;

ceasing use of any one communication path for communications when the weighted error value for the one communication path exceeds or is equal to the first fault threshold; and resuming use of the one communication path when the weighted error value for the one communication path is less than or equal to the second fault threshold.

23. A method as defined in claim 22, wherein each count value relates to the number of occurrences of each type of error per communication path.

24. A method as defined in claim 23, further comprising:

decrementing the count values which are greater than zero by a predetermined amount at a periodic interval.

* * * * *